United States Patent [19]

Buchsel et al.

[11] Patent Number: 5,115,999

[45] Date of Patent: May 26, 1992

[54] AFT DOUBLE DECK AIRPLANE

[75] Inventors: Christian K. E. Buchsel, Issaquah; Gary E. King, Snohomish; Jerry J. Burns, Mukilteo, all of Wash.

[73] Assignee: The Boeing Company, Seattle, Wash.

[21] Appl. No.: 463,249

[22] Filed: Jan. 11, 1990

[51] Int. Cl.⁵ .................. B64C 1/00; B64D 11/00
[52] U.S. Cl. .................. 244/118.5; 244/119; 244/130
[58] Field of Search .............. 244/119, 118.5, 2, 120, 244/129.1, 35 A, 45 R, 91, 130, 118.6, 118.1, 140; 105/340

[56] References Cited

U.S. PATENT DOCUMENTS

| | | | |
|---|---|---|---|
| 1,346,107 | 7/1920 | Alberico | 244/119 X |
| 2,162,227 | 6/1939 | Page | 244/119 |
| 2,236,482 | 3/1941 | Zindel | 244/119 |
| 2,898,059 | 8/1959 | Whitcomb | 244/130 |
| 3,155,348 | 11/1964 | Ricard | 244/119 |
| 4,055,317 | 10/1977 | Greiss | 244/119 X |
| 4,784,353 | 11/1988 | Sigalla | 244/91 |
| 4,925,132 | 5/1990 | Zider | 244/119 |

Primary Examiner—Joseph F. Peters, Jr.
Assistant Examiner—Carla Mattix
Attorney, Agent, or Firm—Delbert J. Barnard

[57] ABSTRACT

An upper deck shell is provided on a main deck shell in the aft region of the fuselage (10). In the aft region (18), an upper deck (38) is provided above the main deck (36). Passenger seats (Sm, Su) are provided on both the main deck (36) and the upper deck (38). A transition region (54) is provided in which a stairway (58) is located. The stairway permits passengers and crew to move between the main deck (36) and the upper deck (38).

15 Claims, 5 Drawing Sheets

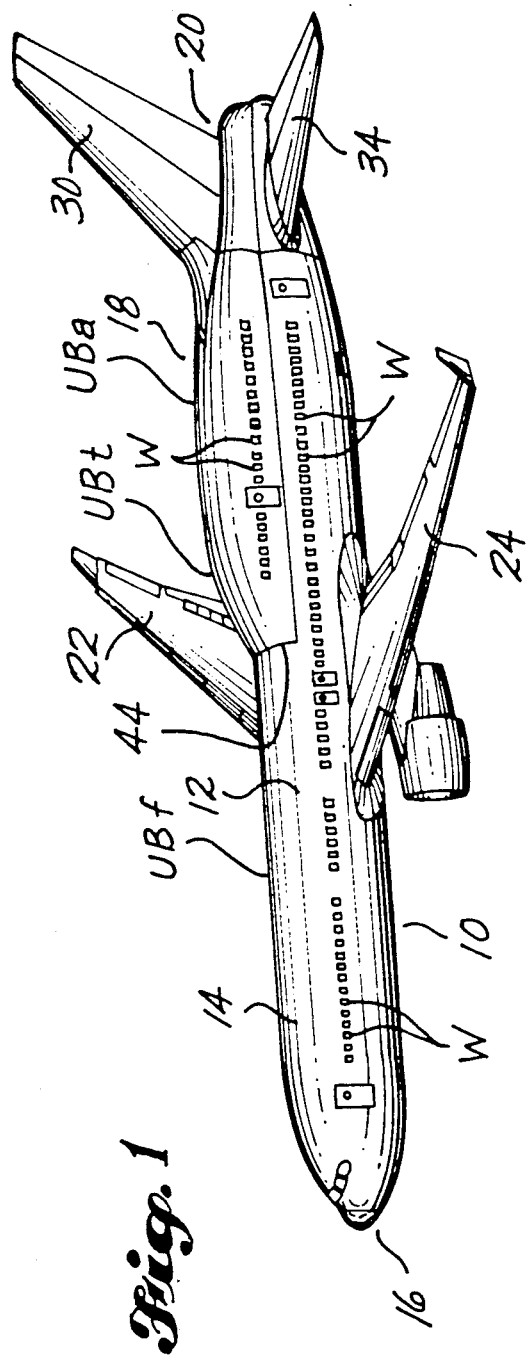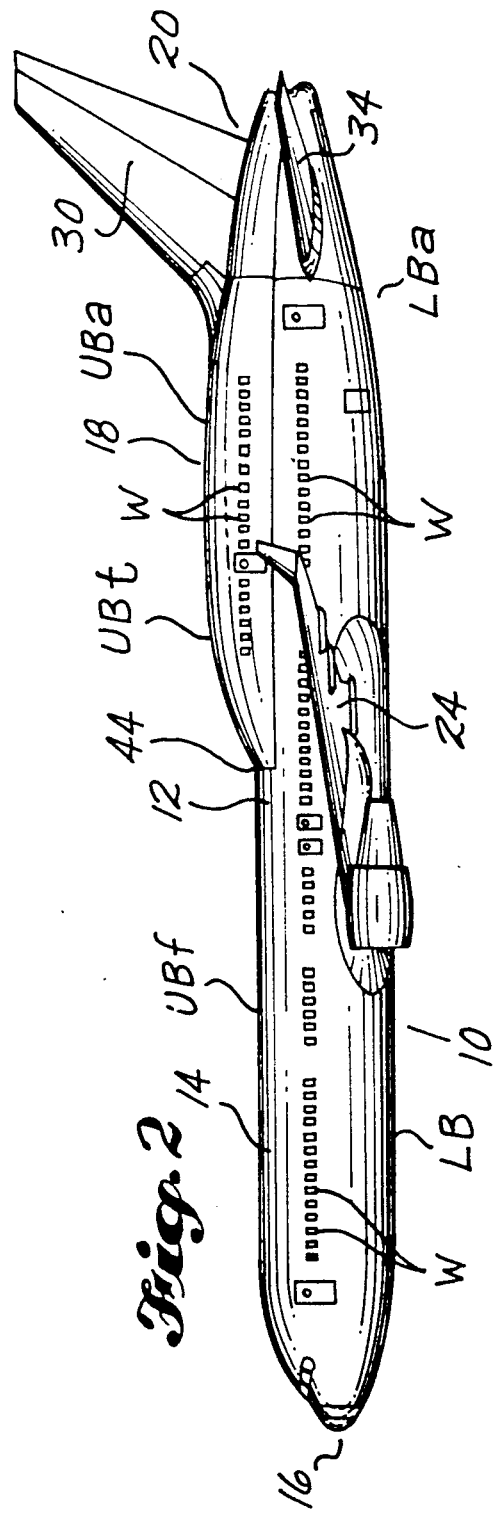

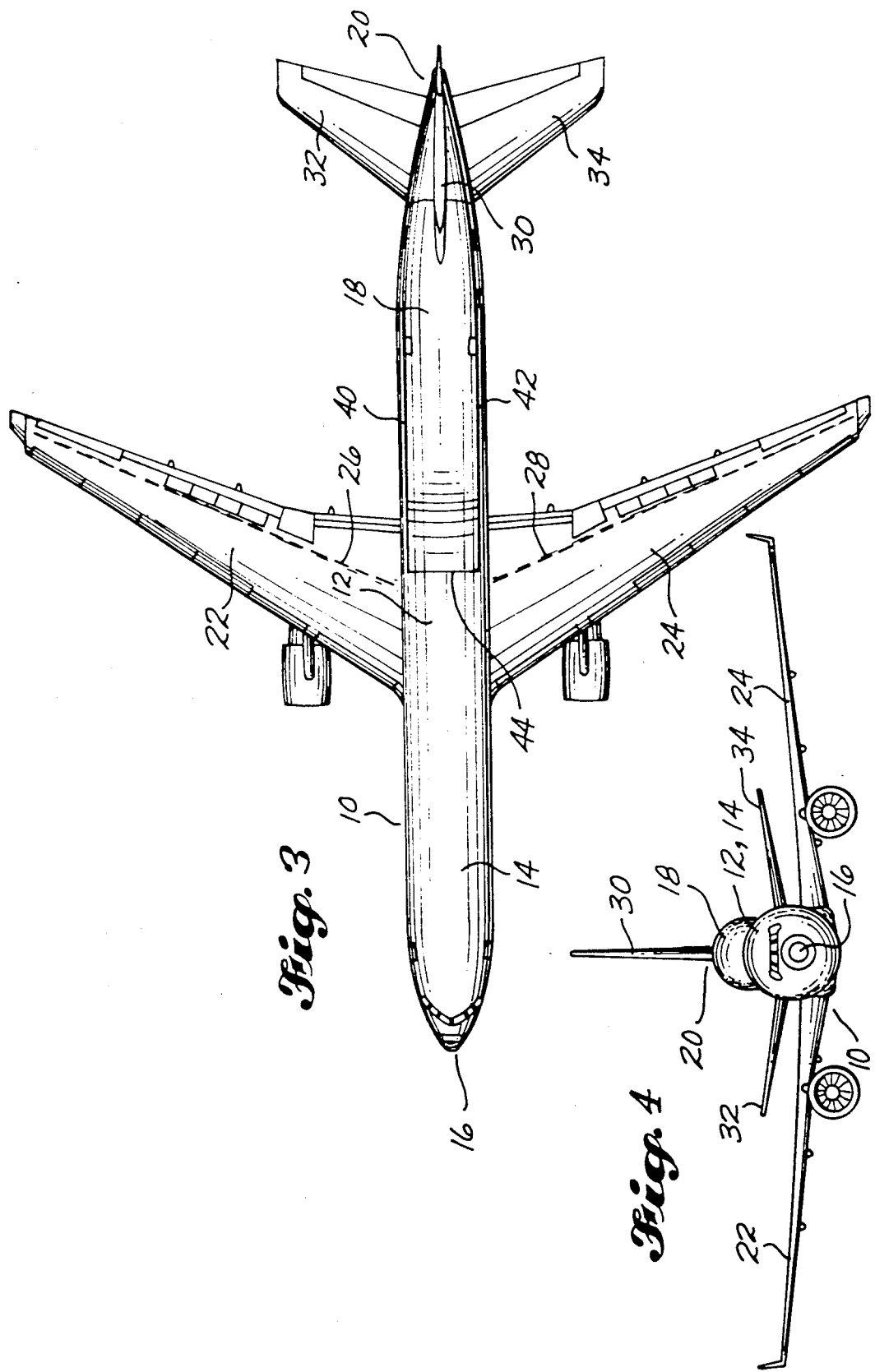

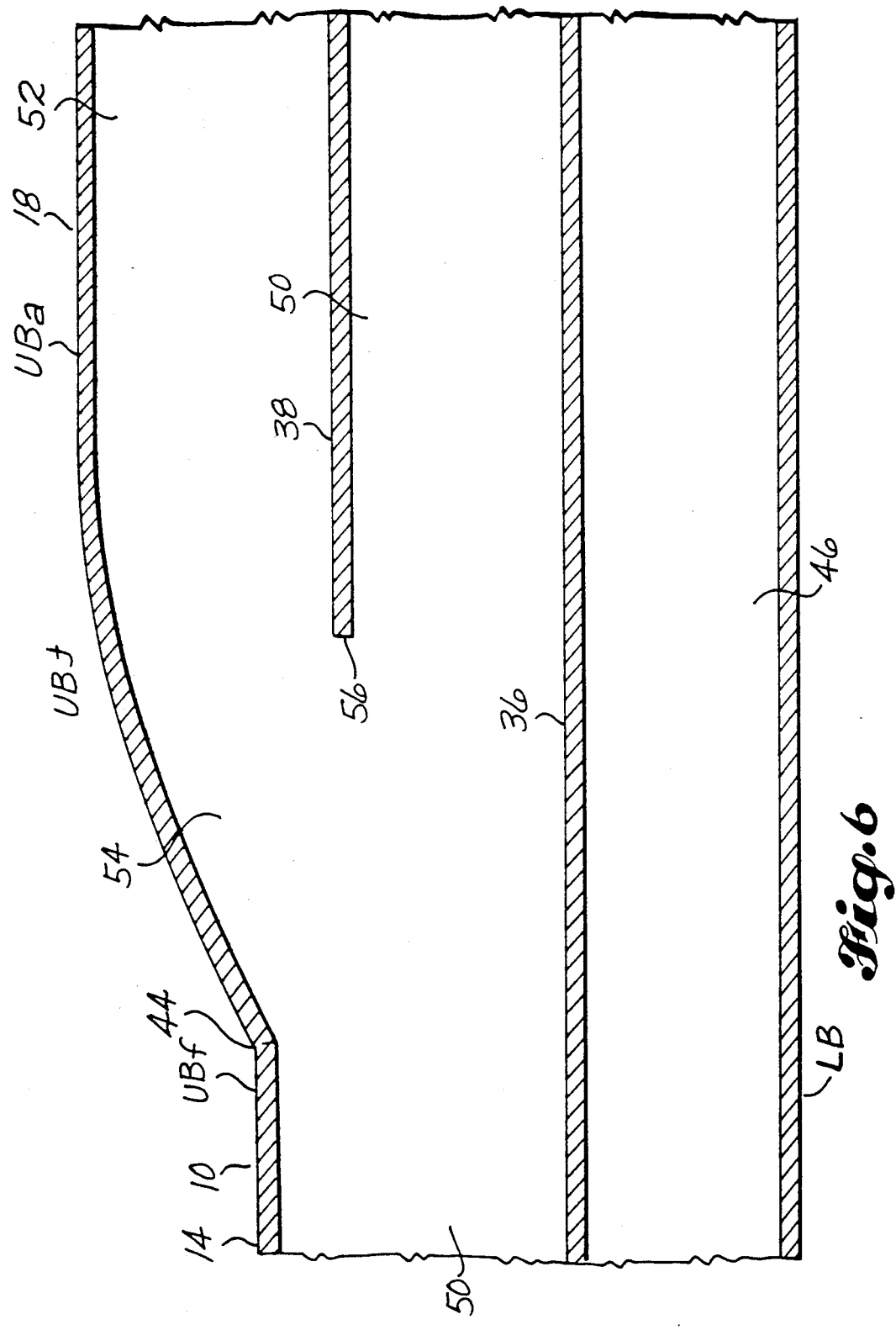

AFT DOUBLE DECK AIRPLANE

TECHNICAL FIELD

This invention relates to improvements in airplanes and, in particular, to the provision of a new partial upper deck airplane which provides a beneficial decrease in drag, in addition to an increase in passenger space.

BACKGROUND INFORMATION

One manner of increasing passenger space in an airplane is to increase the length of the fuselage. This process is commonly known as "stretching". Typical problems associated with "stretching" an airplane and ultimately limiting the size of the airplane are: (1) limitation of aft-body rotational clearance, (2) disproportionate growth of the lower lobe cargo space, and (3) maneuverability of the airplane around the airport. These problems occur in principle with single as well as double deck airplanes. For singledeck airplanes they become critical at a lesser increment of growth then for double deck airplanes. The Boeing 747 airplanes have an upper deck in the forward portion of the fuselage. The Stratocruiser has a lower lobe lounge. The McDonald-Douglas MD11 aircraft has a lower lobe seating option. There have been numerous large flying boats with multiple decks. Usually a double deck configuration is chosen to improve interior efficiency, sometimes utilizing space that was initially provided for other reasons. For example, the upper deck in the Boeing 747 airplanes, was the result of requiring a nose cargo door configuration. Flying boats have unique hull requirements, limiting length and therefore favoring multi-deck arrangements.

Increasing passenger space by use of an additional deck is preferred to merely increasing the length or overall size of the aircraft because it results in a shorter aircraft which is easier to maneuver around an airport. A partial upper deck is preferred because it provides a beneficial ratio of lower lobe cargo space to passenger seat space. Prior experience with the addition of an upper deck to an airplane has provided Mach number and drag penalties. However, heretofore, all upper deck additions have been either a forward partial upper deck or a full upper deck. In the making of the present invention, it was discovered that a partial upper deck in the aft region of the fuselage both provided the desired additional passenger space and reduced drag. The unique body geometry of airplanes embodying the present invention results in an increase in critical Mach number on a Wing of given sweep and thickness. This discovery allows that for a desired critical Mach number a wing can be designed to have less sweep, greater thickness, or a combination of both. The airplane of the present invention is a single deck airplane with an upper deck addition to the aft portion of the fuselage. This design proved to allow growth beyond that which is possible with a conventional stretch aircraft, without experiencing the Mach number drag penalties experienced with a full upper deck or a forward partial upper deck.

DISCLOSURE OF THE INVENTION

An aft double deck airplane according to the present invention is basically characterized by a fuselage having a midportion, a forward portion extending forwardly from said midportion to a nose region, and an aft portion extending rearwardly from the midportion to a tail region. A pair of swept back wings extend laterally outwardly from the midportion of the fuselage, on opposite sides of the airplane. A main deck extends through the forward portion, the midportion and the aft portion of the fuselage. A partial upper deck extends throughout the aft portion of the fuselage above the main deck. The fuselage has an upper outer boundary which extends rearwardly through the forward portion and the midportion at a first level and then rises and extends rearwardly through the aft portion at a higher second level.

In preferred form, the airplane includes a structural shell for the main deck and an upper deck structural shell in the aft portion of the fuselage which is connected to the main deck structural shell The upper deck structural shell projects upwardly from the main deck structural shell to provide the fuselage with an upper lobe extending through the aft portion of the fuselage.

In preferred form, the upper deck is a passenger carrying region and the upper deck structural shell includes windows. Also, there is a stairway extending between the upper deck and the main deck. This stairway is most beneficially provided in a transition region where the upper deck structural shell joins the main deck structural shell. This transition region has a front-to-rear incline to it which closely approximates the front-to-rear incline of the stairway.

In preferred form, the structural shell for the main deck has a length in the forward portion of the elongated body wherein it has a roundish cross-sectional configuration throughout said length, and said structural shell for the main deck and the partial upper deck together have a length in the aft portion of the elongated body wherein they have a substantially constant bicuspal cross-sectional configuration throughout said length. These regions can be varied in length to increase or decrease the seating capacity of a given airplane.

The swept back wings include rear spars having inner ends which are connected to the structural shell for the main deck. In preferred form, the upper boundary for the aft portion of the fuselage commences to rise upwardly from the first level at a location substantially at or rearwardly of the connection of the wing rear spar to the structural shell of the main deck.

The upper boundary of the fuselage preferably rises gradually from the first level to the second higher level and then drops as it extends through the tail region of the fuselage. The fuselage includes a lower boundary which extends rearwardly at a first level and then rises in the tail region. In preferred form, the tail region includes a vertical stabilizer which extends upwardly from the tail region from the fuselage. The vertical stabilizer includes a base portion which is structurally connected to the upper deck structure shell. The tail region preferably also includes a pair of laterally projecting, horizontal stabilizers, one on each side of the tail section. The stabilizers have inner ends which are structurally connected to the structural shell for the main deck.

Other features, objects and advantages of the invention are hereinafter described as a part of the Description of the Best Mode of the Invention.

BRIEF DESCRIPTION OF THE DRAWINGS

In the drawings, like element designations refer to like parts throughout the several views, and FIG. 1 is a pictorial view of an airplane embodying the invention, such view being taken from above and slightly forwardly of the airplane, and looking both downwardly and toward one side of the airplane;

FIG. 2 is side elevational view of the airplane shown by FIG. 1;

FIG. 3 is top plan view of the airplane shown by FIGS. 1 and 2;

FIG. 4 is a front elevational view of the airplane shown by FIGS. 1-3;

FIG. 6 is a longitudinal sectional view, on yet a larger scale, of the forward portion of FIG. 5, with the interior components of the airplane omitted;

BEST MODES FOR CARRYING OUT THE INVENTION

Figure 5:
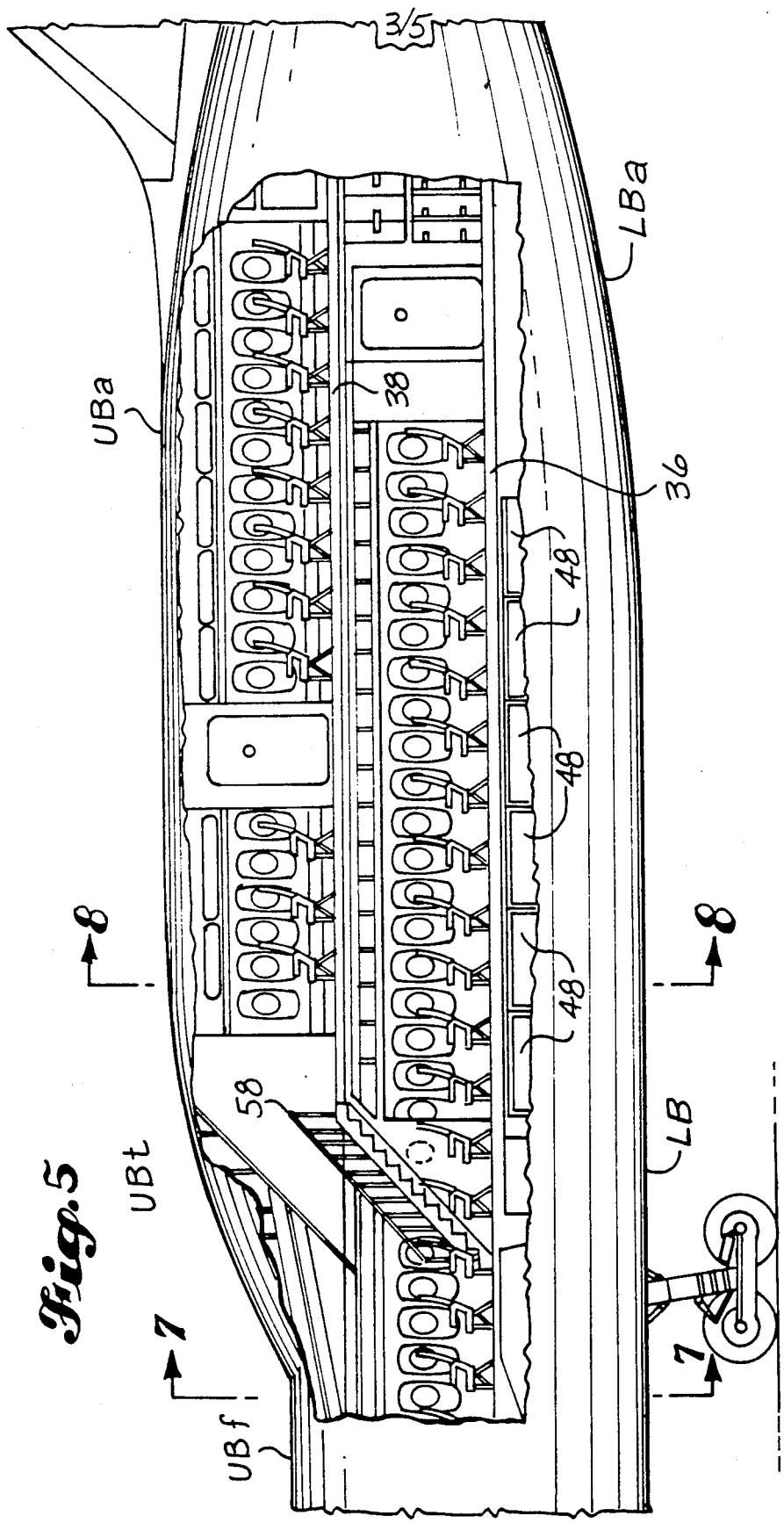
FIG. 5 is an enlarged scale fragmentary elevational view of the aft region of the airplane, with a major portion of such view being broken away for the purpose of illustrating the interior of the airplane.

Referring first to FIGS. 1-4, the illustrated embodiment includes a fuselage 10 having a midportion 12, a forward portion 14 extending forwardly from the midportion 12 to a nose region 16, and an aft portion 18 extending rearwardly from the midportion 12 to a tail region 20.

As best shown by FIG. 3, a pair of sweptback wings 22, 24 extend laterally outwardly from the midportion 12 of the fuselage 10, on opposite sides of the airplane. The wings 22, 24 include rear spars, the location of which is indicated by broken lines 26, 28 in FIG. 3. In the tail region 20, a vertical stablilizer 30 extends upwardly from the tail region of the fuselage. A pair of horizontal stabilizers 32, 34 extend laterally outwardly from the fuselage on opposite sides of the airplane, as clearly shown by FIG. 3.

The airplane includes a main deck 36 which extends throughout essentially the full length of the fuselage 10, and a partial upper deck 38, in the aft portion 18 of the fuselage 10, which extends throughout a major part of the aft portion 18. The fuselage 10 includes a structural shell for the main deck 36 which extends throughout the full length of the fuselage 10. It also includes a structural shell for the upper deck which extends through the aft portion 18 of the fuselage 10. The shape of the fuselage 10 in its several portions or regions is shown collectively by FIGS. 1-8. In the forward portion 14, the structural shell for the main deck 36 has a roundish cross-sectional configuration. In preferred form, the height of the fuselage in this region is slightly larger than the width of the fuselage in this region. The upper deck structural shell is connected to and projects upwardly from the main deck structural shell.

As shown by FIGS. 1, 2, 5 and 6, the fuselage 10 has an upper boundary which extends rearwardly through the forward portion 14 of the fuselage 10 at a first level and then rises and extends rearwardly through the aft portion 18 at a higher level. In FIGS. 6 the upper boundary in the forward portion 14 of fuselage 10 is designated $UB_f$. The upper boundary in the aft portion 18 is designated $UB_1$. In the transition region between the forward portion 14 and the aft portion 18, the upper boundary is designated $UB_t$. It is in this region that the upper boundary rises as it extends rearwardly.

As shown by FIGS. 1-3 and 8, intersection lines 40, 42 exist where the upper deck structural shell meets and is connected to the main deck structural shell As shown by FIG. 3, these intersectional lines 40, 42 preferably initially extend rearwardly substantially parallel, and then converge in the converging region of the fuselage 10 which includes the tail region 20. At its forward end, the structural shell for the upper deck may have a forward boundary 44 which is laterally straight In the transition region, the structural shell progressively increases in height at its center as it extends rearwardly. There is a progressive change in shape from the shape indicated between points 40, 42 in FIG. 7 to the shape indicated between lines 40, 42 in FIG. 8. As best shown in FIG. 2, the fuselage 10 includes a lower boundary LB which extends rearwardly at a first level and then rises in the tail region where at is designated $LB^a$.

Figure 8:
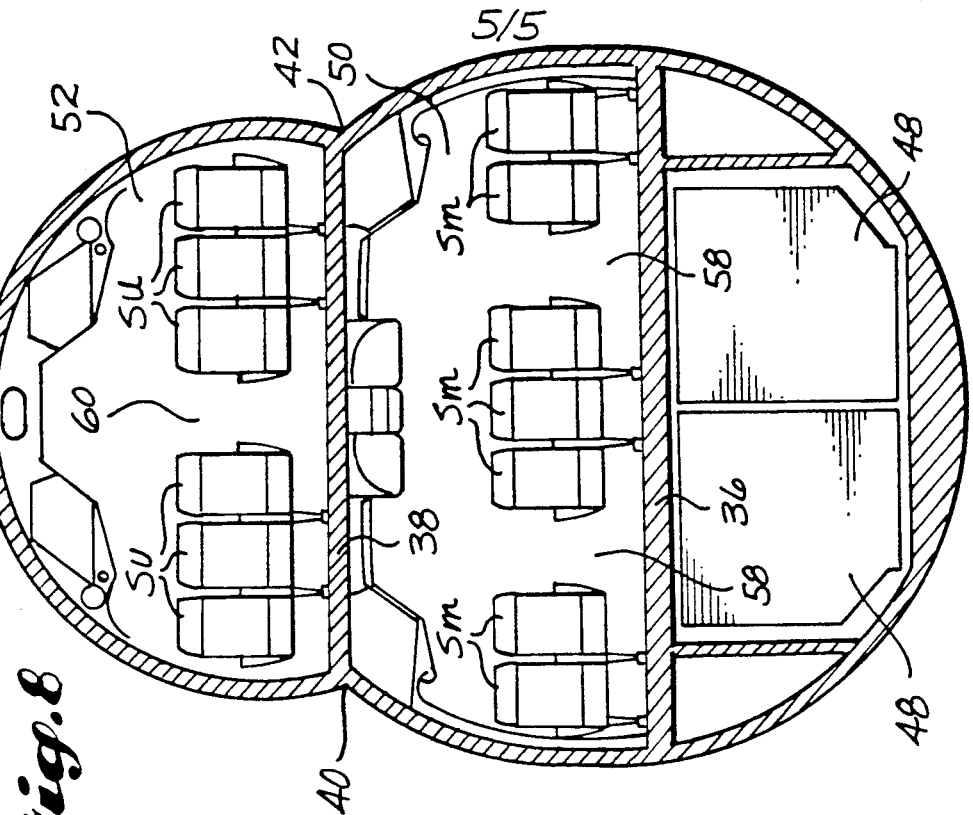
FIG. 8 is cross-sectional view taken along line 8—8 of FIG. 5.
Figure 7:
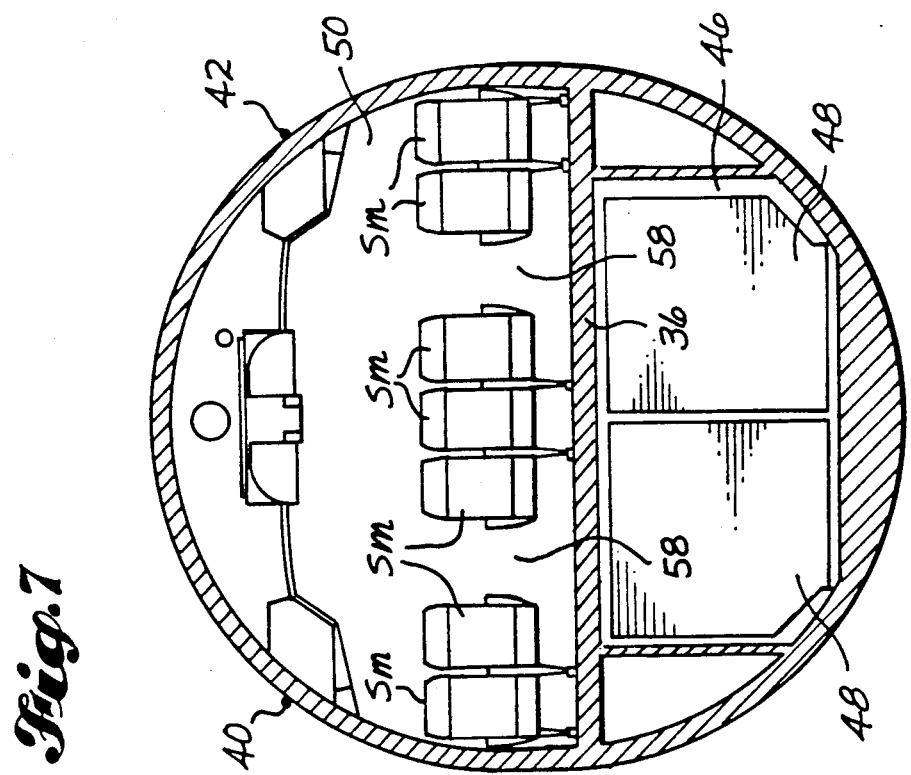
FIG. 7 is a cross-sectional view taken substantially along line 7—7 of FIG. 5.

Referring to FIGS. 5-8, the region or space 46 below the main deck 36 is termed the lower lobe. This region 46 is a cargo carrying region. Cargo containers 48 are shown in FIGS. 7 and 8 and partially in FIG. 5. The main deck region 50 is the region above the main deck 36. It extends throughout essentially the full length of the airplane The upper deck region 52 is the region above the upper deck 38. There is a transition region 54 in which the structural shell for the upper deck 38 rises in relation to the main deck 36 as it extends rearwardly. The upper deck 38 includes a forward end 56 which is positioned rearwardly from boundary 44 a sufficient distance to provide sufficient head room above passengers and crew traveling up or down on a stairway 58 (FIG. 5) which is located in the transition region. Preferably, the stairway 58 is centered laterally of the airplane It has a lower end which meets a central region of the main deck 36 and an upper end which meets a central region of the upper deck 38, substantially at forward end 36.

As shown by FIGS. 5, 7 and 8, passenger seats Sm, Su are provided in the main deck and upper deck regions 50, 52, respectively. Aisle space 58, 60 is provided (FIGS. 7 and 8). Suitable interior structure is provided in each compartment, to provide overhead storage, lighting, etc In similar fashion, suitable interior structure is provided in the transition region 54, above the stairway 58 (FIG. 5).

As shown by FIG. 3, the forward boundary 44 for the upper deck structural shell is located substantially at or rearwardly of the location where the rear wing spars 26, 28 are connected to the fuselage 10. That is, the upper boundary of the fuselage commences to rise upwardly substantially at, or slightly rearwardly of, the location of connection of the rear wing spars 26, 28 to fuselage 10. This location of the forward boundary of the upper level structural shell results in very beneficial drag characteristics, whereas a forward partial upper deck, and a full upper deck, had produced increased drag. The aft upper deck produced reduced drag, and the results were very beneficial when the upper boundary of the upper deck was located substantially at or slightly rearwardly of where the rear wing spars 26, 28 met and were connected to the fuselage 10.

In the illustrated embodiment, the main deck region 50 and the upper deck region 52 are both passenger spaces. As previously described, these spaces include passenger seats Sm, Su. As shown by FIGS. 1 and 2, each of these regions 50, 52 are provided with windows, some of which are designated W.

As shown by FIGS. 1–3, the vertical stabilizer 30 has a base portion which is structurally connected to the upper deck structural shell. The inner ends of the horizontal stabilizers are structurally connected to the structural shell to the main deck.

In summary, the Aft-Double-Deck described above provides a unique change in body geometry which produces an increase in critical Mach Number on a wing of given sweep and thickness. Thus, for a desired Mach Number, a wing can be designed to have less sweep, greater thickness, or a combination of both. Tests conducted with a Boeing 767 provided with an Aft-Double-Deck demonstrated a potential Mach Number increase of 0.01 to 0.02 which is equivalent to a sweep reduction of 2.5° to 5°, with the associated benefits in weight and drag. The addition of an Aft-Double-Deck to single deck airplane allows growth beyond that which is possible with conventional stretch without the Mach Number and drag penalties of a forward or full upper deck. The Aft-Double-Deck also produces a shorter aft-body with greater rotational clearance at the airport. The beneficial influence of the body shape on Mach Number is similar to the "coke bottle" effect in transonic and supersonic airplane design.

For emergency evacuation, the upper deck is considered unconnected to the main deck. One pair of type A doors provide an acceptable rate of egress for up to 110 passengers. With respect to passenger service, the upper deck is operated independently as well. It contains galleys and lavatories. The galleys are supplied from the main deck by means of a cartlift.

Although the Aft-Double-Deck concept could be incorporated into a brand new airplane design, it is most attractive as a means to grow an existing fuselage beyond that which is possible with a conventional single deck stretch. The Aft-Double-Deck configuration also permits a stretch construction. The forward portion 14 can be stretched, i.e. increased in length. The aft portion 18 can be stretched. Or, both portions 14, 18 can be stretched. Stretching involves increasing the lengths of the regions where the cross-sectional configuration is uniform.

The embodiments which have been illustrated and described serve to provide a better understanding of the invention. The invention is not to be limited by such embodiments, but is to be determined from the appended claims, interpreted in accordance with established rules of patent claim interpretation, including use of a Doctrine of Equivalents.

What is claimed is:

1. An aft double deck airplane, comprising:
   a fuselage including a midportion, a forward portion extending forwardly from said midportion to a nose region, and an aft portion extending rearwardly from the midportion to a tail region;
   a pair of swept back wings extending laterally outwardly from the midportion of said fuselage;
   a main deck extending through said forward portion, said midportion and said aft portion of said fuselage;
   a partial upper deck extending throughout said aft portion of said fuselage above said main deck; and
   said fuselage having an upper outer boundary which extends rearwardly through the forward portion and the midportion at a first level and then rises and extends rearwardly throughout the aft portion at a higher second level.

2. An aft double deck airplane according to claim 1, including a structural shell for the main deck and an upper deck structural shell in the aft portion of the fuselage which is connected to the main deck structural shell, said upper deck structural shell projecting upwardly from the main deck structural shell to provide the fuselage with an upper lobe extending through the aft portion of said fuselage.

3. An aft double deck airplane according to claim 2, wherein the upper deck is a passenger carrying region and the upper deck structural shell includes windows.

4. An aft double deck airplane according to claim 2, wherein a stairway extends between the upper deck and the main deck, said stairway being located at the forward end of the upper deck, below the rise in the upper outer boundary of the fuselage.

5. An aft double deck airplane according to claim 4, wherein the upper deck is a passenger carrying region and the upper deck structural shell includes windows 6. An aft double deck airplane according to claim 2, wherein the structural shell for the main deck has a length in the forward portion of the elongated body wherein it has a roundish cross-sectional configuration throughout said length, and said structural shell for the main deck and the structural shell for the upper deck together have a length in the aft portion of the elongated body wherein they have a substantially constant bi-cuspal cross-sectional configuration throughout said length.

7. An aft double deck airplane according to claim 6, wherein said main deck and said upper deck are both passenger carrying regions and the structural shell for the main deck and the upper deck structural shell both include windows.

8. An aft double deck airplane according to claim 7, wherein a stairway extends between the upper and the main deck, said stairway being located at the forward end of the upper deck, below the rise in the upper outer boundary of the fuselage.

9. An aft double deck airplane according to claim 1, wherein the swept back wings each includes rear spars having inner ends connected to the structural shell for the main deck, and wherein the upper boundary for the aft portion of the fuselage commences to rise upwardly from the first level at a location substantially aft or rearwardly of the connection of said wing rear spars to the structural shell for the main deck.

10. An aft double deck airplane according to claim 9, including a structural shell for the main deck and an upper deck structural shell in the aft portion of the fuselage connected to the main deck structural shell, said upper deck structural shell projecting upwardly from the main deck structural shell to provide the elongated body with an upper lobe extending through the aft portion of said fuselage.

11. An aft double deck airplane according to claim 10, wherein the upper deck is a passenger carrying region and the upper deck structural shell includes windows.

12. An aft double deck airplane according to claim 9, wherein a stairway extends between and interconnects the upper deck and the main deck, said stairway being located at the forward end of the upper deck, below the rise in the upper outer boundary of the fuselage.

13. An aft double deck airplane according to claim 12, wherein the upper deck is a passenger carrying region and the upper deck structural shell includes windows.

14. An aft double deck airplane according to claim 1, wherein the upper boundary of the fuselage rises gradually from said first level to the second higher level and then drops as it extends through the tail region, and wherein said fuselage includes a lower boundary which extends rearwardly at a first level and then rises in the tail region.

15. An aft double deck airplane according to claim 14, comprising a vertical stabilizer extending upwardly from the tail region of said fuselage and including a base portion which is structurally connected to the upper deck structural shell, said tail region also including a pair of laterally projecting stabilizers having inner ends which are structurally connected to the structural shell for the main deck.

* * * * *

UNITED STATES PATENT AND TRADEMARK OFFICE
CERTIFICATE OF CORRECTION

PATENT NO. : 5,115,999
DATED : May 26, 1992
INVENTOR(S) : Buchsel, king and Burns It is certified that error appears in the above-indentified patent and that said Letters Patent is hereby corrected as shown below:

Column 2, line 16, there is a period after "shell".
Column 3, line 65, "$UB_1$" should be "$UB_a$".
Column 4, line 3, there is a period after "shell".
Column 4, line 9, there is a period after "straight".
Column 4, line 24, there is a period after "airplane".
Column 4, lines 34 and 35, there is a period after "airplane".
Column 4, line 44, there is a period after "etc".
Claim 8, column 6, line 36, after "upper", insert -- deck --.

Signed and Sealed this

Twenty-fourth Day of August, 1993

Attest:

BRUCE LEHMAN

*Attesting Officer*  *Commissioner of Patents and Trademarks*